United States Patent [19]

Valyocsik

[11] Patent Number: 5,068,096

[45] Date of Patent: Nov. 26, 1991

[54] SYNTHESIS OF CRYSTALLINE SILICATE MCM-47

[75] Inventor: Ernest W. Valyocsik, Yardley, Pa.

[73] Assignee: Mobil Oil Corp., Fairfax, Va.

[21] Appl. No.: 682,045

[22] Filed: Apr. 8, 1991

[51] Int. Cl.$^5$ ............................................. C01B 35/12
[52] U.S. Cl. .................................. 423/277; 423/263; 423/328; 502/77; 208/134; 208/143; 208/208 R; 208/213; 208/108; 208/109; 208/111; 585/520; 585/329
[58] Field of Search ............... 423/277, 263, 326, 328, 423/329; 502/77; 208/134, 143, 208 R, 213, 108–109, 111; 585/520, 329

[56] References Cited

U.S. PATENT DOCUMENTS

| | | | |
|---|---|---|---|
| 4,100,262 | 7/1978 | Pelrine | 423/329 |
| 4,112,056 | 9/1978 | Chen et al. | 423/329 |
| 4,139,600 | 2/1979 | Rollmann et al. | 423/329 |
| 4,151,189 | 4/1979 | Rubin et al. | 260/448 |
| 4,296,083 | 10/1981 | Rollmann | 423/329 |
| 4,341,748 | 7/1982 | Plank et al. | 423/328 |
| 4,391,785 | 7/1983 | Rosinski et al. | 423/329 |
| 4,439,409 | 3/1984 | Puppe et al. | 423/328 |
| 4,452,769 | 6/1984 | Chu et al. | 423/329 |
| 4,482,531 | 11/1984 | Kuehl | 423/329 |
| 4,490,342 | 12/1984 | Valyocsik | 423/328 |
| 4,531,012 | 7/1985 | Valyocsik | 564/295 |
| 4,537,754 | 8/1985 | Casci et al. | 423/277 |
| 4,539,193 | 9/1985 | Valyocsik | 423/328 |
| 4,559,213 | 12/1985 | Kuhl | 423/329 |
| 4,568,654 | 2/1986 | Valyocsik | 502/62 |
| 4,584,286 | 4/1986 | Valyocsik | 502/62 |
| 4,585,638 | 4/1986 | Kuhl | 423/328 |
| 4,585,639 | 4/1986 | Szostak | 423/328 |
| 4,585,746 | 4/1986 | Valyocsik | 502/62 |
| 4,585,747 | 4/1986 | Valyocsik | 502/62 |
| 4,592,902 | 6/1986 | Valyocsik | 423/328 |
| 4,619,820 | 10/1986 | Valyocsik | 423/328 |
| 4,623,527 | 11/1986 | Derouane et al. | 423/306 |
| 4,632,815 | 12/1986 | Valyocsik | 423/328 |
| 4,637,923 | 1/1987 | Szostak | 423/328 |
| 4,640,829 | 2/1987 | Rubin | 423/328 |
| 4,665,250 | 5/1987 | Chu et al. | 585/415 |
| 4,954,325 | 9/1990 | Rubin et al. | 423/328 |
| 4,981,663 | 1/1991 | Rubin | 423/277 |

FOREIGN PATENT DOCUMENTS 0013630 4/1984 European Pat. Off. .

OTHER PUBLICATIONS

Lok, B. M. et al., "The Role of Organic Molecules in Molecular Sieve Synthesis", ZEOLITES, vol. 3, pp. 282–291 (1983).

Primary Examiner—R. Bruce Breneman
Attorney, Agent, or Firm—Alexander J. McKillop; Charles J. Speciale; Lori F. Cuomo

[57] ABSTRACT

This invention relates to a new form of crystalline material identified as zeolite MCM-47, to a new and useful improvement in synthesizing said crystalline material and to use of said crystalline material prepared in accordance herewith as a catalyst for organic compound, e.g. hydrocarbon compound, conversion.

17 Claims, No Drawings

SYNTHESIS OF CRYSTALLINE SILICATE MCM-47

CROSS-REFERENCE TO RELATED APPLICATIONS

This application is related in scope of subject matter to U.S. application Ser. No. 07/682,044 filed on even date herewith.

BACKGROUND OF THE INVENTION

1. Field of the Invention

This invention relates to a new and useful improvement in synthesizing a crystalline silicate identified as MCM-47, the new MCM-47 synthesized, and use of the crystalline material synthesized in accordance herewith as a catalyst component for organic compound, e.g. hydrocarbon compound, conversion.

More particularly, this invention relates to an improved method for preparing the crystalline MCM-47 structure whereby synthesis is facilitated and reproducible and the product exhibits high purity and catalytic utility.

2. Discussion of the Prior Art

Crystalline silicate MCM-47 and its conventional preparation is taught by U.S. Pat. No. 4,637,923, the entire disclosure of which is incorporated herein by reference. It has a distinctive X-ray diffraction pattern which identifies it from other known crystalline materials.

Lok et al. (3 Zeolites, 282-291 (1983)) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show the presently required organic for synthesis of MCM-47. The zeolitic compositions labeled "PSH-3" in U.S. Pat. No. 4,439,409 are synthesized from reaction mixtures containing hexamethyleneimine as directing agent. U.S. Pat. No. 4,954,325 utilizes hexamethyleneimine in another reaction mixture to direct synthesis of MCM-22. That organic is used in U.S. Pat. No. 4,981,663 for synthesis of yet another crystalline structure labelled MCM-35.

U.S. Pat. No. 4,391,785 teaches a method for synthesis of zeolite ZSM-12 from a reaction mixture comprising, as a directing agent, a compound selected from the group consisting of dimethyl pyridinium halide and dimethyl pyrrolidinium halide. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,112,056 teaches a synthesis method for ZSM-12 from a reaction mixture containing tetraethylammonium ions as directing agent. U.S. Pat. No. 4,452,769 claims a method for synthesizing ZSM-12 from a reaction mixture containing methyltriethylammonium ions as the directing agent. European Patent Application 13,630 claims synthesis of ZSM-12 from a reaction mixture containing a directing agent define as an organic compound containing nitrogen and comprising "an alkyl or aryl group having between 1 and 7 carbon atoms, at least one of which comprises an ethyl radical".

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829 teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of another novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 ;with a DABCO-C$_n$-diquat, n being 4,5,6 or 10, directing agent; and U.S. Pat. No. 4,539,193, teaching use of bis (dimethylpiperidinium) trimethylene directing agent for synthesis of ZSM-12.

U.S. Pat. No. 4,139,600 teaches a method for synthesis of zeolite ZSM-5 from a reaction mixture comprising, as a directing agent, an alkyldiamine. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonium hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a particular assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R)N^+(CH_3)_3$, where R is a saturated or unsaturated hydrocarbon having 7 carbon atoms. U.S. Pat. No. 4,665,250 teaches the use of linear diquaternary ammonium compounds of the structure $(CH_3)_3N^+(CH_2)_mN^+(CH_3)_3$, m being 5, 6, 8, 9 or 10, for synthesis of ZSM-48. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4or6}N^+(CH_3)_2(C_2H_5$ as directing agent for synthesis of ZSM-12. Synthesis of ZSM-5 is directed by the diquaternary (alkyl)$_3$N$^+$(CH$_2$)$_6$N$^+$(alkyl)$_3$, alkyl being propyl or butyl, in U.S. Pat. No. 4,585,638.

EPA 42,226 and U.S. Pat. No. 4,537,754 teach existence of numerous diquaternary ammonium compounds, but show use of (CH$_3$)$_3$N$^+$(CH$_2$)$_6$N$^+$(CH$_3$)$_3$ as directing agent for synthesis of EU-1. EPA 51,318 teaches use of the same diquaternary for synthesis of TPZ-3. It is noted that EU-1, TPZ-3 and ZSM-50 have the same structure.

Applicant knows of no prior art method for preparing a crystalline MCM-47 structure utilizing the present method.

SUMMARY OF THE INVENTION

An improved, economical and reproducible method for preparing a crystalline silicate identified as zeolite MCM-47 exhibiting high purity, catalytic activity and other valuable properties is provided. The method comprises forming a reaction mixture hydrogel containing sources of alkali or alkaline earth metal (M) cations; an oxide of trivalent element (X), e.g. aluminum, boron, iron, gallium, indium and mixtures thereof; an oxide of tetravalent element (Y), e.g. silicon, germanium, tin and mixtures thereof; bis(methylpyrrolidinium)-DIQUAT-4 directing agent (R); and water, said reaction mixture having a composition in terms of mole ratios, within the following ranges:

| Reactants | Useful | Preferred |
|---|---|---|
| YO$_2$/X$_2$O$_3$ | 200 to ∞ | 300 to 10,000 |
| H$_2$O/YO$_2$ | 5 to 400 | 20 to 100 |
| OH$^-$/YO$_2$ | 0 to 1.0 | 0.05 to 0.4 |
| M/YO$_2$ | 0 to 2.0 | 0.10 to 1.0 |
| R/YO$_2$ | 0.005 to 2.0 | 0.05 to 1.0 |

The method further comprises maintaining the reaction mixture until crystals of the MCM-47 of structure are formed. Reaction conditions required consist of heating the foregoing reaction mixture to a temperature of from about 60° C. to about 230° C. for a period of time of from about 6 hours to about 20 days. A more preferred temperature range is from about 100° C. to about 200° C. with the amount of time at a temperature in such range being from about 2 days to about days. The solid product comprising MCM-47 crystals is recovered from the reaction medium, as by cooling the whole to room temperature, filtering and water washing.

EMBODIMENTS

The particular effectiveness of the presently required organic directing agent having a 4-carbon methylene chain length, when compared with other directing agents, such as those identified above, for the present synthesis is believed due to its ability to function as a template in the nucleation and growth of MCM-47 crystals from the above high YO$_2$, e.g. SiO$_2$, high alkalinity, e.g. low OH$^-$/YO$_2$, reaction mixture. This is true even though no predigestion of the gel is required prior to crystallization. When the organic template has a shorter methylene chain length, such as bis(methylpyrrolidinium)-DIQUAT-3, MCM-47 is no longer crystallized. This different organic directing agent functions in this fashion in the reaction mixture having the above described composition and under the above described conditions of temperature and time.

The crystalline product of the present method has a YO$_2$/X$_2$O$_3$, e.g. SiO$_2$/Al$_2$O$_3$, molar ratio within a rather broad range of from about 200 to greater than about 2000.

It should be noted that the ratio of components of the reaction mixture required herein are critical to achieve maximum effectiveness. For instance, if the YO$_2$/X$_2$O$_3$ ratio is less than about 180, another zeolite phase will form. In general, with higher YO$_2$/X$_2$O$_3$ ratios in the reaction mixture, crystallization of MCM-47 proceeds in a timely, efficient manner.

The synthesis of the present invention is facilitated when the reaction mixture comprises seed crystals, such as those having the structure of MCM-47. The use of at least 0.01%, preferably about 0.10%, and even more preferably about 1% seed crystals (based on total weight) of crystalline material will be useful.

The reaction mixture composition for the synthesis of MCM-47 crystals hereby can be prepared utilizing materials which can supply the appropriate oxide. The useful sources of X$_2$O$_3$, e.g. aluminum oxide, include, as non-limiting examples, any known form of such oxide, e.g. aluminum oxide or hydroxide, organic or inorganic salt or compound, e.g. alumina and aluminates. The useful sources of YO$_2$, e.g. silicon oxide, include, as non-limiting examples, known forms of such oxide, e.g. silicic acid or silicon dioxide, alkoxy- or other compounds of silicon, including silica gel and silica hydrosol.

It will be understood that each oxide component utilized in the reaction mixture for this synthesis can be supplied by one or more essential reactants and they can be mixed together in any order. For example, any oxide can be supplied by an aqueous solution. The reaction mixture can be prepared either batchwise or continuously. Crystal size and crystallization time for the product composition comprising the MCM-47 crystals will vary with the exact nature of the reaction mixture employed within the above limitations.

The bis(methylpyrrolidinium)-DIQUAT-4 directing agent has been found to effectively stabilize the developing crystal framework of MCM-47 during hydrothermal synthesis using the above high YO$_2$, high alkalinity reaction mixture. It also leads to a MCM-47 crystal framework capable of an extremely wide range of YO$_2$/X$_2$O$_3$ mole ratios as shown herein.

The MCM-47 crystal composition prepared hereby has a characteristic X-ray diffraction pattern, including values substantially as set forth in Table 1, hereinafter.

TABLE 1

| Interplanar d-Spacing, (A) | Relative Intensity (I/I$_o$) |
|---|---|
| 10.9 ± 0.15 | vs |
| 6.91 ± 0.08 | w |
| 6.23 ± 0.08 | w |
| 5.18 ± 0.05 | w-m |
| 4.90 ± 0.05 | w |
| 4.35 ± 0.05 | m |
| 4.17 ± 0.03 | m |
| 3.86 ± 0.03 | w |
| 3.81 ± 0.03 | w |
| 3.78 ± 0.03 | w |
| 3.67 ± 0.03 | w |
| 3.57 ± 0.03 | m |
| 3.48 ± 0.03 | vs |

These X-ray diffraction data were collected with a Rigaku diffraction system, equipped with a graphite diffracted beam monochromator and scintillation counter, using copper K-alpha radiation. The diffraction data were recorded by step-scanning at 0.02 degrees of two-theta, where theta is the Bragg angle, and a counting time of 1 second for each step. The interplanar spacings, d's, were calculated in Angstrom units (A), and the relative intensities of the lines, $I/I_o$, where $I_o$ is one-hundredth of the intensity of the strongest line, above background, were delivered with the use of a profile fitting routine (or second derivative algorithm). The intensities are uncorrected for Lorentz and polarization effects. The relative intensities are given in terms of the symbols vs=very strong (75-100), s=strong (50-74), m=medium (25-49) and w=weak (0-24). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition nature and degree of pore filling, and thermal and/or hydrothermal history. It is noticed that the MCM-47 crystals of this invention exhibit an X-ray diffraction pattern with the d-spacing maxima of MCM-47, but with slightly different relative intensities.

The crystalline silicate MCM-47 prepared hereby has a composition involving the molar relationship:

$$X_2O_3:(y)YO_2$$

wherein X is a trivalent element, such as aluminum, boron, iron, indium and/or gallium, preferably aluminum; Y is a tetravalent element, such as silicon, tin and/or germanium, preferably silicon; and y is at least about 200, usually from about 400 to greater than about 3000, more usually from about 500 to about 3000. In the as-synthesized form, the crystalline silicate has a formula, on an anhydrous basis and in terms of moles of oxides per y moles of $YO_2$, as follows:

$$(5-60)R_2O:(0-40)M_2O:X_2O_3:yYO_2$$

wherein M and R are as defined above. The M and R components are associated with the material as a result of their presence during crystallization, and are easily removed by post-crystallization methods hereinafter more particularly described.

Synthetic MCM-47 crystals prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the MCM-47 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic MCM-47 crystals, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized MCM-47 can be prepared by heating same at a temperature of from about 200° C. to about 550° C. for from 1 hour to about 48 hours.

The original cations, e.g. alkali or alkaline earth metal, of the as-synthesized material can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB and VIII of the Periodic Table of the Elements, especially gallium, indium and tin.

Typical ion exchange technique would be to contact the synthetic MCM-47 material with a salt of the desired replacing cation or cations. Examples of such salts include the halides, e.g. chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the MCM-47 is then preferably washed with water and dried at a temperature ranging from 65° C. to about 315° C. and thereafter may be calcined in air or other inert gas at temperatures ranging from about 200° C. to about 55° C. for periods of time ranging from 1 to 48 hours or more to produce a catalytically-active thermal decomposition product thereof.

The crystalline silicate MCM-47 prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the crystals hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina, titania and/or zirconia. The latter may be either naturally occurring or in the form of gelatinous precipitates, sols or gels including mixtures of silica and metal oxides. Use of a material in conjunction with the MCM-47, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized crystalline material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present crystals can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalytically active form of the catalyst of this invention which may contain additional hydrogenation components, reforming stocks can be reformed employing a temperature between about 370° C. and about 540° C. The pressure can be between about 100 psig and about 1000 psig, but it is preferably between about 200 psig and about 700 psig. The liquid hourly space velocity is generally between about 0.1 and about 10, preferably between about 0.5 and about 4, and the hydrogen to hydrocarbon mole ratio is generally between about 1 and about 20, preferably between about 4 and about 12.

The catalyst can also be used for hydroisomerization of normal paraffins, when provided with a hydrogenation component, e.g. platinum. Hydroisomerization is carried out at a temperature between about 90° C. and 375° C., preferably about 145° C. to about 290° C., with a liquid hourly space velocity between about 0.01 and about 2, preferably between about 0.25 and about 0.50, employing hydrogen such that the hydrogen to hydrocarbon mole ratio is between about 1:1 and about 5:1. Additionally, the catalyst can be used for olefin or aromatic isomerization, employing a temperature between about 200° C. and about 480° C.

The catalyst can also be used for reducing the pour point of gas oils. This reaction may be conducted at a liquid hourly space velocity between about 10 and about 30 and at a temperature between about 425° C. and about 595° C.

Other reactions which can be accomplished employing the catalyst of this invention containing a metal, e.g. platinum, include hydrogenation-dehydrogenation reactions and desulfurization reactions, olefin polymerization (oligomerization) and other organic compound conversions such as the conversion of alcohols (e.g. methanol) to hydrocarbons, and the alkylation of aromatics (e.g. benzene).

In order to more fully illustrate the nature of the invention and the manner of practicing same, the following examples are presented. In the examples, whenever absorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by addition of absorbate vapor controlled by a manostat during the adsorption period, which did not exceed about 8 hours. As adsorbate was adsorbed by the sorbant material, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLE 1

A 2.88 gram quantity of NaOH pellets was dissolved in 138.4 grams deionized water. After all the NaOH had dissolved, 11.5 grams of the organic template bis(methylpyrrolidinium)-DIQUAT-4 was dissolved in the basic solution. This solution was then transferred to a 300 ml stainless steel autoclave. 48.0 grams of colloidal silica sol (30% $SiO_2$) were mixed into the solution in the autoclave and the resulting hydrogel was stirred vigorously at room temperature for two minutes. The final hydrogel is described by the mole ratios as follows:

| | |
|---|---|
| $SiO_2/Al_2O_3 =$ | ∞ |
| $OH^-/SiO_2 =$ | 0.30 |
| $R/SiO_2 =$ | 0.10 |
| $H_2O/SiO_2 =$ | 40 |
| $Na^+/SiO_2 =$ | 0.30 |

The autoclave was then sealed and heating and stirring were begun immediately. The zeolite crystallization was carried out at 160° C. with stirring (400 rpm) for 4 days.

At the end of 4 days, the crystallization was terminated by quenching the autoclave to room temperature in a water-ice bath. The resultant zeolite product was filtered, washed in boiling deionized water and finally filtered.

The crystalline product was dried under an infrared heat lamp in an airstream.

The product of this Example had the X-ray spectra shown in Table 2.

TABLE 2

| Degrees 2-Theta | Interplanar d-Spacing (A) | Relative Intensity |
|---|---|---|
| 7.787 | 11.194 | 100.0 |
| 12.473 | 6.997 | 10.1 |
| 13.937 | 6.264 | 5.7 |
| 15.021 | 5.815 | >1.0 |
| 15.281 | 5.717 | >1.0 |
| 15.596 | 5.602 | 1.9 |
| 16.513 | 5.293 | >1.0 |
| 16.655 | 5.248 | 8.2 |
| 16.769 | 5.212 | 1.3 |
| 16.830 | 5.194 | 1.9 |
| 16.951 | 5.157 | 1.9 |
| 17.664 | 4.950 | 4.4 |
| 17.805 | 4.911 | >1.0 |
| 17.957 | 4.870 | 1.9 |
| 20.015 | 4.374 | 11.4 |
| 20.273 | 4.319 | >1.0 |
| 20.343 | 4.304 | 1.3 |
| 20.497 | 4.272 | 1.9 |
| 20.855 | 4.199 | 7.6 |
| 21.804 | 4.019 | 1.9 |
| 22.565 | 3.885 | 4.4 |
| 22.824 | 3.841 | >1.0 |
| 22.891 | 3.830 | 3.8 |
| 23.479 | 3.736 | 4.4 |
| 23.667 | 3.706 | >1.0 |
| 23.778 | 3.689 | 3.2 |
| 24.268 | 3.616 | 1.9 |
| 24.348 | 3.604 | 1.9 |
| 24.477 | 3.586 | 7.6 |
| 24.963 | 3.517 | 2.3 |
| 25.069 | 3.502 | 43.3 |
| 25.831 | 3.400 | 7.0 |
| 25.936 | 3.387 | 1.3 |
| 26.136 | 3.362 | 5.7 |
| 26.198 | 3.354 | 2.5 |
| 26.295 | 3.342 | 5.1 |
| 26.479 | 3.319 | >1.0 |
| 26.689 | 3.293 | 1.3 |
| 26.824 | 3.277 | >1.0 |
| 26.938 | 3.263 | >1.0 |
| 27.021 | 3.253 | >1.0 |
| 27.168 | 3.236 | 1.3 |
| 27.607 | 3.186 | 1.9 |
| 27.894 | 3.153 | 1.3 |
| 28.001 | 3.142 | >1.0 |
| 28.080 | 3.133 | 1.3 |
| 28.554 | 3.082 | 1.9 |
| 29.075 | 3.028 | >1.0 |
| 29.259 | 3.009 | 1.3 |
| 29.420 | 2.993 | 1.9 |

Table 3 presents details of Example 1 and additional examples of zeolite syntheses over a very broad mixture $SiO_2/Al_2O_3$ range from about 90 to silica-only ($\infty$) with the organic directing agents bis(methylpyrrolidinium)-DIQUAT-4 and bis(methylpyrrolidinium)-DIQUAT-3. The preparation of Example 1 was repeated for additional Examples 2 through 9.

From the examples in Table 3 it was found that the novel zeolite MCM-47 was synthesized when the mixture $SiO_2/Al_2O_3$ ratio of the hydrogel was greater than about 200/1 with the organic template cation bis(methylpyrrolidinium)-DIQUAT-4. In Examples 8 and 9 when the mixture $SiO_2/Al_2O_3$ ratio of the hydrogel was less than about 200/1, a zeolite other than MCM-47 was crystallized with this same organic template.

The synthesis of zeolite MCM-47 is very specific with organic template cations of the size of bis(methylpyrrolidinium)-DIQUAT-4. In Example 5 when the organic template cation was bis(methylpyrrolidinium)-DIQUAT-3, only α-quartz was produced from the silica-only hydrogel.

TABLE 3

Crystallization of MCM-47
160° C.; stirred

| Example No. | Mixture Composition (Mole Ratios) | | | | | Time, Days | Product |
|---|---|---|---|---|---|---|---|
| | $SiO_2{}^a/Al_2O_3$ | $H_2O/SiO_2$ | $OH/SiO_2$ | $Na^+/SiO_2$ | $R^b/SiO_2$ | | |
| 1 | ∞ | 40 | 0.30 | 0.30 | 0.10 | 6 | MCM-47 |
| 2 | ∞ | 40 | 0.30 | 0.30 | 0.10 | 3 | MCM-47 |
| 3 | ∞ | 40 | 0.30 | 0.30 | 0.10 | 4 | MCM-47 |
| 4 | ∞ | 40 | 0.30 | 0.30 | 0.10 | 7 | MCM-47 |
| 5 | 300 | 40 | 0.30 | 0.31 | 0.10 | 4 | MCM-47 + zeolite other than MCM-47 |
| 6 | 500 | 40 | 0.30 | 0.31 | 0.10 | 4 | MCM-47 + zeolite other than MCM-47 |
| 7 | ∞ | 40 | 0.30 | 0.30 | 0.10 | 7$^c$ | α-Quartz only |
| 8 | 180 | 40 | 0.30 | 0.31 | 0.10 | 6 | Zeolite other than MCM-47 |
| 9 | 90 | 40 | 0.30 | 0.32 | 0.10 | 6 | Zeolite other than MCM-47 |

$^a$Silica sol (30% $SiO_2$)

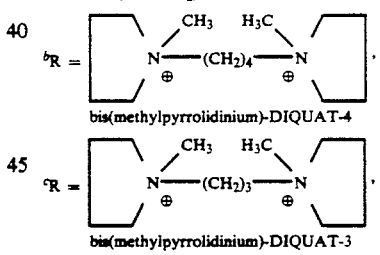

Table 4 lists the analytical results for the MCM-47 products produced in Examples 1–4 of Table 3. The data show that the organic template remained intact within the product MCM-47 zeolite framework.

The MCM-47 compositions were calculated on the basis of 100 ($SiO_2+AlO_2{}^-$) tetrahedra since the structure of new zeolite MCM-47 is unknown. There was a constant composition of nearly 5 bis(methylpyrrolidinium)-DIQUAT-4 cations (R) per 100 tetrahedra in the MCM-47 products, indicating templating activity for the organic cation.

TABLE 4

| | | Analyses of MCM-47 Samples | | | | | | |
|---|---|---|---|---|---|---|---|---|
| Example No. | C moles$^a$ N Moles | Moles per mole $Al_2O_3$ | | | Composition$^b$ | | | |
| | | $N_2O$: | $Na_2O$: | $SiO_2$ | Al/100 Td | $Na^+$/100 Td | N/100 Td | $R^c$/100 Td |
| 1 | 6.67 | 50.7 | 6.29 | 918 | 0.22 | 1.37 | 11.0 | 5.5 |
| 2 | 7.71 | 98.0 | 35.2 | 1840 | 0.11 | 3.82 | 10.6 | 5.3 |
| 3 | 7.12 | 73.9 | 16.4 | 1365 | 0.15 | 2.40 | 10.8 | 5.4 |

TABLE 4-continued

| | | Analyses of MCM-47 Samples | | | | | | |
|---|---|---|---|---|---|---|---|---|
| | C moles[a] | Moles per mole Al$_2$O$_3$ | | | Composition[b] | | | |
| Example No. | N Moles | N$_2$O: | Na$_2$O: | SiO$_2$ | Al/100 Td | Na$^+$/100 Td | N/100 Td | R$^c$/100 Td |
| 4 | 7.47 | 104 | 13.1 | 2089 | 0.09 | 1.25 | 9.9 | 4.9 |

[a]Theor. C/N = 7/1
[b]Based on 100 (SiO$_2$ + AlO$_2^-$) tetrahedra (Td)

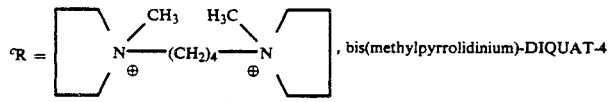, bis(methylpyrrolidinium)-DIQUAT-4

Changes and modifications in the specifically described embodiments can be carried out without departing from the scope of the invention which is intended to be limited only by the scope of the appended claims.

What is claimed is:

1. A method for synthesizing crystalline material exhibiting a characteristic X-ray diffraction pattern including d-spacing maxima values, in Angstroms, as follows:

10.9±0.15
6.91±0.08
6.23±0.08
5.18±0.05
4.90±0.05
4.35±0.05
4.17±0.03
3.86±0.03
3.81±0.03
3.78±0.03
3.67±0.03
3.57±0.03
3.48±0.03 which comprises (i) preparing a mixture capable of forming said material, said mixture comprising sources of alkali or alkaline earth metal (M), an oxide of trivalent element (X), an oxide of tetravalent element (Y), water and bis(methylpyrrolidinium)-DIQUAT-4 directing agent (R), and having a composition, in terms of mole ratios, within the following ranges:

| YO$_2$/X$_2$O$_3$ | 200 to ∞ |
|---|---|
| H$_2$O/YO$_2$ | 5 to 400 |
| OH$^-$/YO$_2$ | 0 to 1.0 |
| M/YO$_2$ | 0 to 2.0 |
| R/YO$_2$ | 0.005 to 2.0 |

(ii) maintaining said mixture under sufficient conditions until crystals of said material are formed; and
(iii) recovering said crystalline material from step (ii), said recovered crystalline material containing said R.

2. The method of claim 1 wherein said mixture has the following composition ranges:

| YO$_2$/X$_2$O$_3$ | 300 to 10,000. |
|---|---|
| H$_2$O/YO$_2$ | 20 to 100 |
| OH$^-$/YO$_2$ | 0.05 to 0.4 |
| M/YO$_2$ | 0.10 to 1.0 |
| R/YO$_2$ | 0.05 to 1.0. |

3. The method of claim 1 wherein said mixture further comprises seed crystals in sufficient amount to enhance synthesis of said crystalline material.

4. The method of claim 3 wherein said seed crystals have the structure of MCM-47.

5. The method of claim 1 wherein X is selected from the group consisting of aluminum, boron, iron, gallium, indium and mixtures thereof, and said Y is selected from the group consisting of silicon, germanium, tin and mixtures thereof.

6. The method of claim 1 wherein X comprises aluminum and Y comprises silicon.

7. A mixture capable of forming crystals of MCM-47 structure upon crystallization, said mixture comprising sources of alkali or alkaline earth metal (M), trivalent element (X) oxide selected from the group consisting of oxide of aluminum, boron, iron, gallium, indium and mixtures thereof; tetravalent element (Y) oxide selected from the group consisting of oxide of silicon, germanium, tin and mixtures thereof; water and bis(methylpyrrolidinium)-DIQUAT-4 (R), and having a composition, in terms of mole ratios, within the following ranges:

| YO$_2$/X$_2$O$_3$ | 200 to ∞ |
|---|---|
| H$_2$O/YO$_2$ | 20 to 100 |
| OH$^-$/YO$_2$ | 0.05 to 0.4 |
| M/YO$_2$ | 0.10 to 1.0 |
| R/YO$_2$ | 0.05 to 1.0. |

8. The method of claim 1 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

9. The method of claim 2 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

10. The method of claim 8 wherein said replacing ion is hydrogen or a hydrogen precursor.

11. The method of claim 9 wherein said replacing ion is hydrogen or a hydrogen precursor.

12. The recovered crystalline material of claim 1.

13. The recovered crystalline material of claim 2.

14. The R-containing product crystalline material of claim 8.

15. The R-containing product crystalline material of claim 9.

16. The R-containing product crystalline material of claim 10.

17. The R-containing product crystalline material of claim 11.

* * * * *